US006172888B1

United States Patent
Jochi

(10) Patent No.: US 6,172,888 B1
(45) Date of Patent: Jan. 9, 2001

(54) RESISTANCE WELDING POWER SUPPLY APPARATUS

(75) Inventor: Takashi Jochi, Chiba-ken (JP)

(73) Assignee: Miyachi Technos Corporation, Chiba-ken (JP)

(*) Notice: Under 35 U.S.C. 154(b), the term of this patent shall be extended for 0 days.

(21) Appl. No.: 09/547,880

(22) Filed: Apr. 12, 2000

(30) Foreign Application Priority Data

Apr. 23, 1999 (JP) .................................. 11-116749

(51) Int. Cl.[7] .................................................. H02M 7/04
(52) U.S. Cl. .................................................. 363/89
(58) Field of Search ................. 363/78, 81, 84, 363/89, 125, 127; 219/110

(56) References Cited

U.S. PATENT DOCUMENTS

| | | | |
|---|---|---|---|
| 4,546,234 | * | 10/1985 | Ogasawara et al. ............ 219/137 PS |
| 5,570,254 | * | 10/1996 | Spilger et al. ........................ 361/18 |
| 5,591,355 | * | 1/1997 | Ishikawa ............................. 219/110 |
| 5,748,462 | * | 5/1998 | Moro et al. ............................. 363/97 |
| 5,757,176 | * | 5/1998 | Farrow ................................. 323/320 |
| 5,834,729 | * | 11/1998 | Ishikawa ............................. 219/110 |
| 5,856,920 | * | 1/1999 | Buda et al. ........................... 363/149 |
| 5,866,866 | * | 2/1999 | Shimada ............................. 219/110 |
| 6,011,235 | * | 1/2000 | Mukai et al. ........................ 219/110 |

* cited by examiner

*Primary Examiner*—Adolf Deneke Berhane
(74) *Attorney, Agent, or Firm*—Wenderoth, Lind & Ponack, L.L.P.

(57) ABSTRACT

A main control unit can be for example a microprocessor (CPU) or a dedicated logic circuit. Functionally, it comprises a setting unit 50 for imparting to respective units various set values (data) of various conditions entered from an input unit 46, a sequence control unit 52 for providing a control of the weld time, a current error detector unit 54 for the constant-current control and a voltage error detector unit 56 for the constant-voltage control, a selector unit 58 for selecting one of error detected values fed respectively from the error detector units 54 and 56, a PWM pulse generator unit 60 for generating a control pulse CP in accordance with the error detected value selected by the selector unit 58, a mode switching monitor unit 62 for monitoring a current measured value $I_M$ and a voltage measured value $V_M$ for the switching of welding current control modes, a monitoring unit 64 for monitoring electrical parameters associated with the welding current control mode out of selection, and a display control unit 66 for the output of data to be displayed on a display unit 48.

8 Claims, 11 Drawing Sheets

WELDING
CURRENT $I_J$
$I_S$

INTERELECTRODE
VOLTAGE $V_J$
$V_J'$
$V_S$

L'
Vmax
Vmin
L

CONTROL PULSE $CP_A$

CONTROL PULSE $CP_B$

WELDING CURRENT

INVERTER OUTPUT

WELDING CURRENT $I_2$

RESISTANCE WELDING POWER SUPPLY APPARATUS

BACKGROUND OF THE INVENTION

1. Field of the Invention

The present invention relates to a transistor or inverter resistance welding power supply apparatus.

2. Description of the Related Arts

Transistor or inverter resistance welding power supply apparatuses have hitherto often be used for precision resistance welding of materials such as metal foils or small-gage wires.

The transistor power supply is a method substantially allowing only transistors to intervene between a capacitor storing welding energies and welding electrodes without interposition of any welding transformer therebetween, the transistors serving to control a welding current discharged from the capacitor, previous to the supply to the materials to be welded together. In the inverter power supply a commercial-frequency power is converted by an inverter into a high-frequency power which in turn is fed via the transformer to the materials to be welded together. Both the power supply methods are able to flow a DC welding current with rapid rise of the welding current and provide a minute constant-current control or constant-voltage control.

In the transistor or inverter resistance welding power supply apparatus, as described above, the constant-current control and the constant-voltage control are both often employed as welding current control modes. Such a conventional resistance welding power supply apparatus is arranged to make an alternative selection of either of the constant-current control and the constant-voltage control for a single welding current supply. Thus, in case of selection of the constant-current control, a desired current value is set and entered without entry of any voltage set value for the constant-voltage control. On the contrary, in case of selection of the constant-voltage control, a desired voltage value is set and entered without entry of any current set value.

However, even though the desired welding current flows as a result of selection of the constant-current control, too high a voltage applied to the materials to be welded together may bring about any spatters, possibly resulting in defective welding. As opposed to this, even though the desired welding voltage is applied as a result of selection of the constant-voltage control, an excessive welding current may also result in defective welding or may cause faults in the power supply circuit.

In addition, the conventional power supply apparatus has merely provided a feedback control for the purpose of execution of current supply in a given welding current control method during the welding current supply, but has by no means provided a feature to detect any abnormal phenomena associated with parameters out of selection as described above or a feature to ensure a quick transition to proper processing upon the occurrence of any abnormality.

SUMMARY OF THE INVENTION

The present invention was conceived with the aim of overcoming the above prior art deficiencies. It is therefore an object of the present invention to provide a transistor or inverter resistance welding power supply apparatus capable of simultaneous setting of both constant-current control and constant-voltage control, allowing flexible adaptations to a diversity of welding requirements or to variations in welding situations.

Another object of the present invention is to provide a transistor or inverter resistance welding power supply apparatus allowing both current monitor and voltage monitor to be set at the same time as well as capable of simultaneous setting of both the constant-current control and constant-voltage control so as to ensure an acquisition of beneficial monitoring information in accordance with the welding current control mode selected.

According to an aspect of the present invention, in order to achieve the above objects, there is provided a transistor or an inverter resistance welding power supply apparatus comprising set value input means for the input of a desired current set value and a desired voltage set value; constant-current control means for allowing a value of current fed to materials to be welded together to coincide with the current set value; constant-voltage control means for allowing a value of voltage between a pair of welding electrodes to coincide with the voltage set value; welding current control mode selecting means for selecting either of a first welding current control mode provided by the constant-current control means and a second welding current control mode provided by the constant-voltage control means, the selecting means making a switchover from the first welding current control mode to the second welding current control mode when the value of interelectrode voltage reaches a predetermined critical voltage value, the selecting means making a switchover from the second welding current control mode to the first welding current control mode when the value of current fed to the materials to be welded together reaches a predetermined critical current value; and current supply sequence control means for executing a welding current supply in a welding current control mode selected by the welding current control mode selecting means.

In the present invention, switchover of the welding current control modes is automatically carried out and no limitations are imposed on the directions of switchover (from first mode to second, and vice versa) and on the number of times of switchover.

The welding current control mode selecting means may include priority mode selection means for selecting either of the first welding current control mode and the second welding current control mode in accordance with a previously set priority when the value of current fed to the materials to be welded together has not yet reached the critical current value and when the value of interelectrode voltage has not yet reached the critical voltage value.

In addition to the above features, the resistance welding power supply apparatus of the present invention may further comprise current monitoring means for monitoring a current fed to the materials to be welded together; voltage monitoring means for monitoring a voltage between the pair of welding electrodes; and monitor mode selecting means for selecting a first monitor mode provided by the voltage monitoring means when the first welding current control mode is in selection, and for selecting a second monitor mode provided by the current monitoring means when the second welding current control mode is in selection. It may further comprise welding current control mode history recording means for recording a history of welding current control modes selected during the welding current supply.

BRIEF DESCRIPTION OF THE DRAWINGS

The above and other objects, aspects, features and advantages of the present invention will become more apparent from the following detailed description when taken in conjunction with the accompanying drawings, in which:

FIGS. 7A and 7B illustrate waveforms of welding current and of welding interelectrode voltage, respectively, during the welding current supply in the first embodiment;

DESCRIPTION OF THE PREFERRED EMBODIMENTS

The present invention will now be described with reference to the accompanying drawings which illustrate presently preferred embodiments thereof in a nonlimitative manner.

Figure 1:
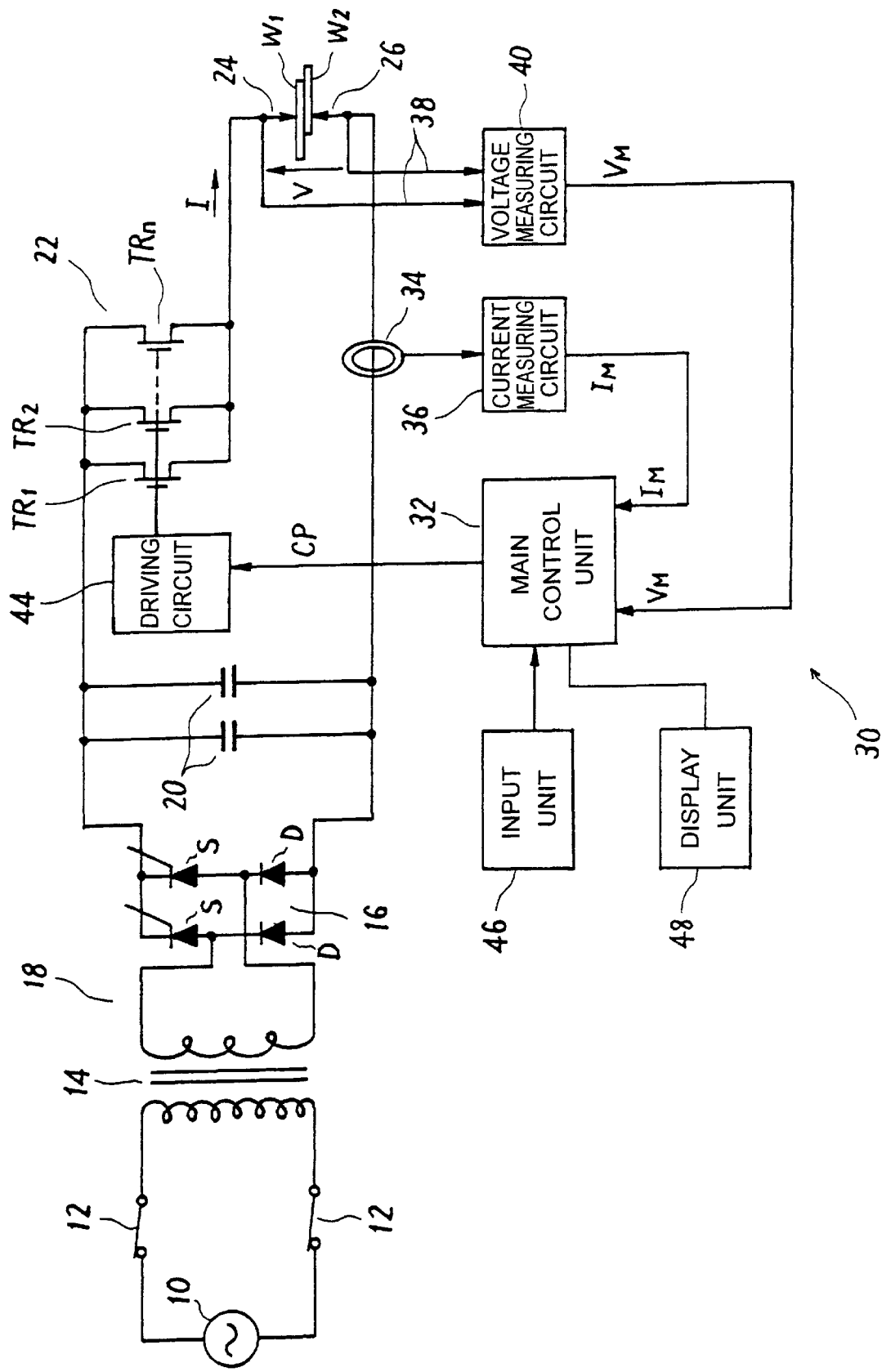
FIG. 1 is a block diagram showing a circuit configuration of a transistor resistance welding power supply apparatus in accordance with a first embodiment of the present invention.

FIG. 1 illustrates a circuit configuration of a transistor resistance welding power supply apparatus in accordance with a first embodiment of the present invention.

The resistance welding power supply apparatus comprises a large-capacity capacitor 20 for storing welding energies in the form of electric charges, a charging unit 18 for charging the capacitor 20 up to a predetermined voltage, a plurality of transistors (transistor group) 22 which are electrically connected in parallel to one another between the capacitor 20 and a welding electrode 24 on one hand, and a control unit 30 for switchingly operating the transistor group 22 at a predetermined frequency during the current supply in order to provide a control of a welding current I.

The charging unit 18 comprises a charging transformer 14 and a rectifier circuit 16. The charging transformer 14 has a primary coil connected via a couple of main power supply switches 12 to an AC power supply 10 (e.g., 200V) of a commercial frequency and has a secondary coil for the output of a voltage stepped down to e.g., 30V. The rectifier circuit 16 is a single-phase half-controlled bridge converter consisting of two thyristors S and two diodes D which are bridge connected to each other. The rectifier circuit serves to rectify an AC voltage from the charging transformer 14 into a DC voltage so as to charge the capacitor 20 up to a predetermined voltage, e.g., 24V. The thyristors S are firing controlled by a firing circuit for charging not shown, in synchronism with the cycle of the commercial AC power supply 10.

The capacitor 20 consists of a single or a plurality of low-voltage large-capacity capacitors which are connected in parallel to one another and has a capacity of the order of 1.2 F for example.

The transistor group 22 includes a plurality of, e.g., 25 high-speed transistors $TR_1$, $TR_2$, . . . $TR_n$ such as FETs (Field Effect Transistors) or IGBTs (Insulated Gate Bipolar Transistors) which are in parallel with each other. Each transistor $TR_i$ has a first terminal (e.g., collector or drain) electrically connected to a terminal on one hand of the capacitor 20 and has a second terminal (e.g., emitter or source) electrically connected to the welding electrode 24 on one hand. Each transistor $TR_i$ further has a control terminal (base or gate) connected to an output terminal of a driving circuit 44.

The welding electrode 24 on one hand and a welding electrode 26 on the other are coupled to a pressurizing mechanism not shown in order that they are brought into pressure contact with materials $W_1$ and $W_2$ to be welded together during the welding operation. The welding electrode 26 on the other is electrically connected to a terminal on the other of the capacitor 20.

The control unit 30 comprises a main control unit 32 for providing a control of switching operations of the transistor group 22 by way of the driving circuit 44. The control unit 30 further comprises various sensors and measuring circuits or computing circuits so as to provide a feedback control of the welding current or interelectrode voltage.

In this configuration, a current sensor, e.g., a toroidal coil 34 is fitted to a conductor through which the welding current I flows, with a current measuring circuit 36 connected to an output terminal of the current sensor 34. A voltage measuring circuit 40 is connected via voltage sensor wires 38 to both the welding electrodes 24 and 26.

The current measuring circuit 36 determines an effective value or an average value of the welding current I as a current measured value for each cycle of the switching frequency on the basis of output signals fed from the current sensor 34 and imparts each current measured value $I_M$ to the main control unit 32.

The voltage measuring circuit 40 determines an effective value or an average value of the interelectrode voltage V as an interelectrode voltage measured value for each cycle of the switching frequency on the basis of interelectrode voltage detection signals obtained through the voltage sensor wires 38 and imparts each voltage measured value $V_M$ to the main control unit 32.

It will be noted that the current measuring circuit 36 and the voltage measuring circuit 40 can be either an analog circuit or a digital circuit and that in case of the analog circuit, its output signals (measured values, computed values) may be converted into digital signals by means of an A-D converter not shown prior to delivery to the main control unit 32.

The main control unit 32 can be comprised of a microprocessor (CPU) or a dedicated logic circuit for example. As will be described later, the main control unit 32 includes a setting unit, a sequence control unit, a PWM control unit, a mode switching monitor unit, a monitoring unit and other features.

An input unit 46 comprises input devices such as a keyboard and a mouse, and an interface circuit required. The input unit 46 is used to enter data in the form of set values of various welding conditions such as the weld time, pulse width initial value, welding current and interelectrode voltage, set values of various monitoring conditions, and commands associated therewith. The data entered through the input unit 46 are stored in the memory of the main control unit 32.

A display unit 48 can be for example a liquid crystal display and provides a display of set values or designated values entered by the user or a display of monitor data, alarms, etc., to be presented (output) by the apparatus.

Figure 2:
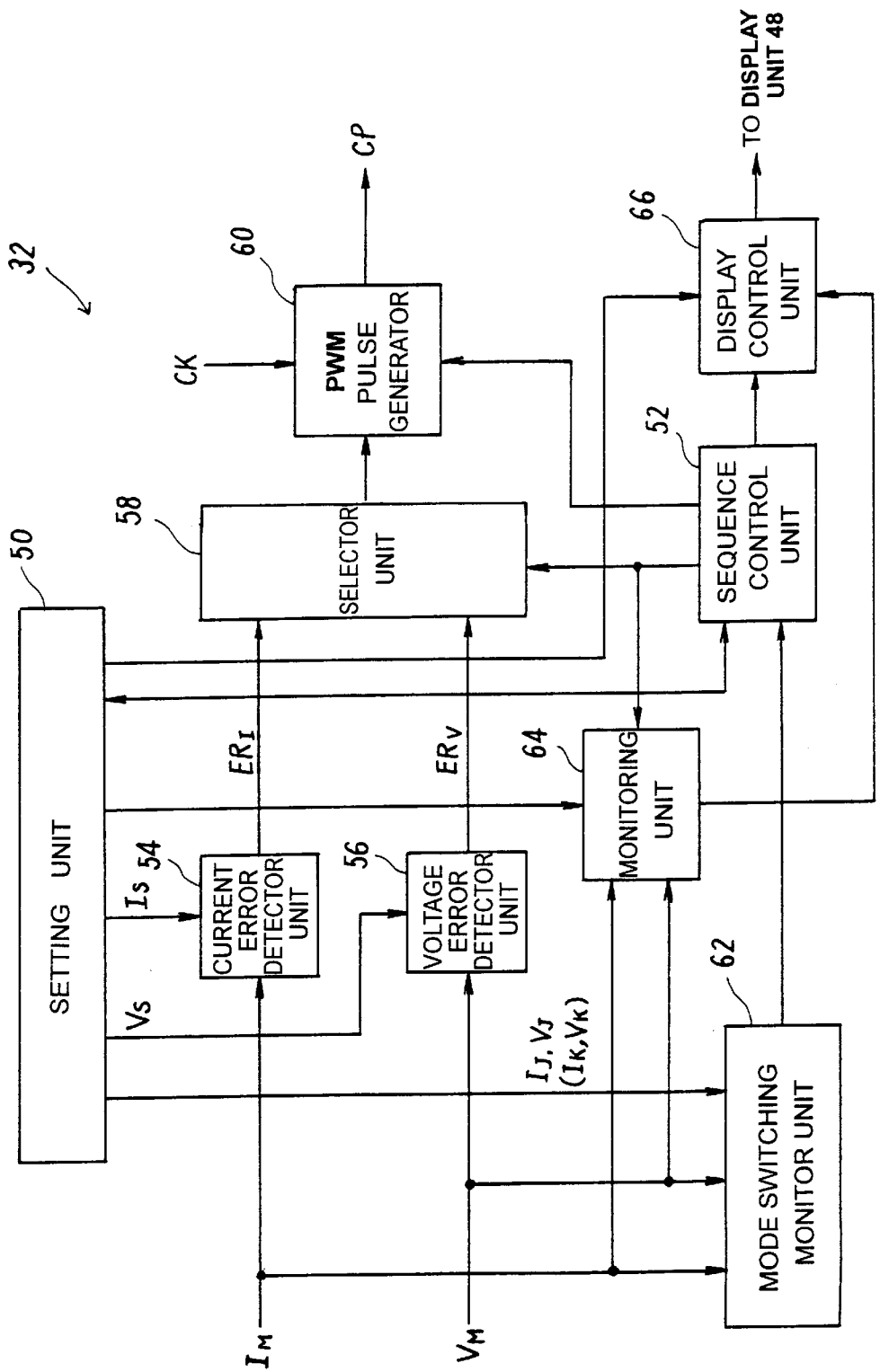
FIG. 2 is a block diagram showing a functional configuration of a main control unit included in the first embodiment.

FIG. 2 is a block diagram showing a functional configuration of the main control unit 32.

From the functional viewpoint, the main control unit 32 comprises a setting unit 50 for imparting set values (data) of various conditions entered through the input unit 46 to the associated units, a sequence control unit 52 for providing a control of the weld time, a current error detector unit 54 for constant-current control and a voltage error detector unit 56 for constant-voltage control, a selector unit 58 for selecting one of error detected values obtained from the error detector units 54 and 56, a PWM pulse generator unit 60 for generating a control pulse CP in accordance with the error detected value selected by the selector unit 58, a mode switching monitor unit 62 which monitors the current measured value $I_M$ and the voltage measured value $V_M$ in order to switch the welding current control modes, a monitoring unit 64 which monitors electrical parameters of the welding current control modes out of selection, and a display control unit 66 for providing data to be displayed on the display unit 48.

The current error detector unit 54 compares the welding current measured value $I_M$ from the current measuring circuit 36 with a welding current set value $I_S$ from the setting unit 50 and provides a difference therebetween as a current error detected value $ER_I$. The voltage error detector unit 56 compares the interelectrode voltage measured value $V_M$ from the voltage measuring circuit 40 with an interelectrode voltage set value $V_S$ from the setting unit 50 and provides a difference therebetween as a voltage error detected value $ER_V$. Both the error detected values $ER_I$ and $ER_V$ are fed to the selector unit 58.

The set values $I_S$ and $V_S$ fed from the setting unit 50 may be fixed values having desired values or may be waveform values which can arbitrarily vary with time in the form of desired waveforms.

When the sequence control unit 52 selects the welding current control mode for the constant-current control, the selector unit 58 makes a selection of the current error detected value $ER_I$ from the current error detector unit 54 and provides it as output to the PWM pulse generator unit 60. The PWM pulse generator unit 60 generates a control pulse CP for allowing the welding current I to coincide with the welding current set value $I_S$.

When the sequence control unit 52 selects the welding current control mode for the constant-voltage control, the selector unit 58 makes a selection of the voltage error detected value $ER_V$ from the voltage error detector unit 56 and provides it as output to the PWM pulse generator unit 60. The PWM pulse generator unit 60 generates a control pulse CP for allowing the interelectrode voltage V to coincide with the interelectrode voltage set value $V_S$.

The PWM pulse generator unit 60 accepts not merely the error detected values ER from the selector unit 58 but also accepts clocks CK of a high frequency, e.g., 20 kHz defining the frequency (switching frequency) of the control pulse CP from a clock circuit not shown so as to operate during only the weld time under the control of the sequence control unit 52.

Figure 3:
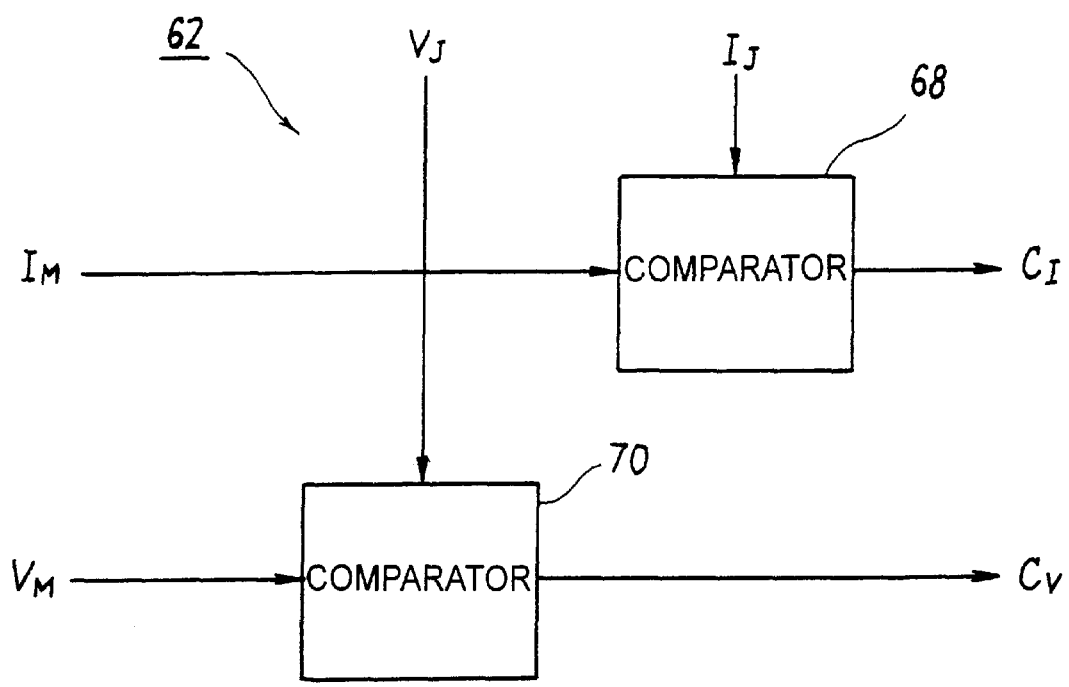
FIG. 3 is a block diagrams showing by way of example a configuration of a mode switching monitor unit included in the first embodiment.

FIG. 3 illustrates by way of example a configuration of the mode switching monitor unit 62 for use in the first embodiment. The mode switching monitor unit 62 of this example includes a couple of comparators 68 and 70.

The comparator 68 on one hand compares the welding current measured value $I_M$ from the current measuring circuit 36 with a current reference value $I_J$ for comparison from the setting unit 50 and provides as its output a comparison judgment signal $C_I$ indicative of the relationship of magnitude therebetween. For example, if $I_M < I_J$ then the $C_I = 0$, and if $I_M \geq I_J$, then $C_I = 1$.

The comparator 70 on the other compares the interelectrode voltage measured value $V_M$ from the voltage measuring circuit 40 with a voltage reference value $V_J$ for comparison from the setting unit 50 and provides as its output a comparison judgment signal $C_V$ indicative of the relationship of magnitude therebetween. For example, if $V_{M<VJ}$, then $C_V = 0$, and if $V_M \geq V_J$, then $C_V = 1$.

Outputs $C_I$ and $C_V$ of both the comparators 68 and 70 are fed to the sequence control unit 52. The reference values $I_J$ and $V_J$ for comparison can be selected to be values in accordance with the current set value $I_S$ and voltage set value $V_S$, respectively, for example $I_J = I_S + \delta_i$, $V_J = V_S + \delta_v$, respectively. As used herein, $\delta_i$ and $\delta_v$ represent appropriate offset values (including positive or negative values and zero, which may vary with time) relative to $I_S$ and $V_S$, respectively.

In the normal welding current supply, the outputs of the comparators 68 and 70 will be $C_I = 0$ and $C_V = 0$, respectively, irrespective of which welding current control mode is selected between the constant-current control or the constant-voltage control.

During the welding current supply, the sequence control unit 52 monitors the comparator outputs C corresponding to the electrical parameters or measured values ($I_M$ or $V_M$) of the welding current control method out of selection. More specifically, when the constant-current control method is selected, the sequence control unit 52 monitors the output $C_V$ of the comparator 70 for voltage comparison, whereas when selection is made of the constant-voltage control, it monitors the output $C_I$ of the comparator 68 for current comparison. Then, when the comparator output C to be monitored turns from 0 to 1, the sequence control unit 52 makes a judgment that the electrical parameters or measured values of the welding current control method out of selection have reached their critical values and performs a switching to the welding current control method associated with those electrical parameters.

For instance, when the comparator output $C_V$ for voltage comparison changes over from 0 to 1 in the constant-current controlled welding current control mode, the sequence control unit 52 provides a control of the selector unit 58 so as to allow a switching of the welding current control mode from the constant-current control to the constant-voltage control.

Figure 4:
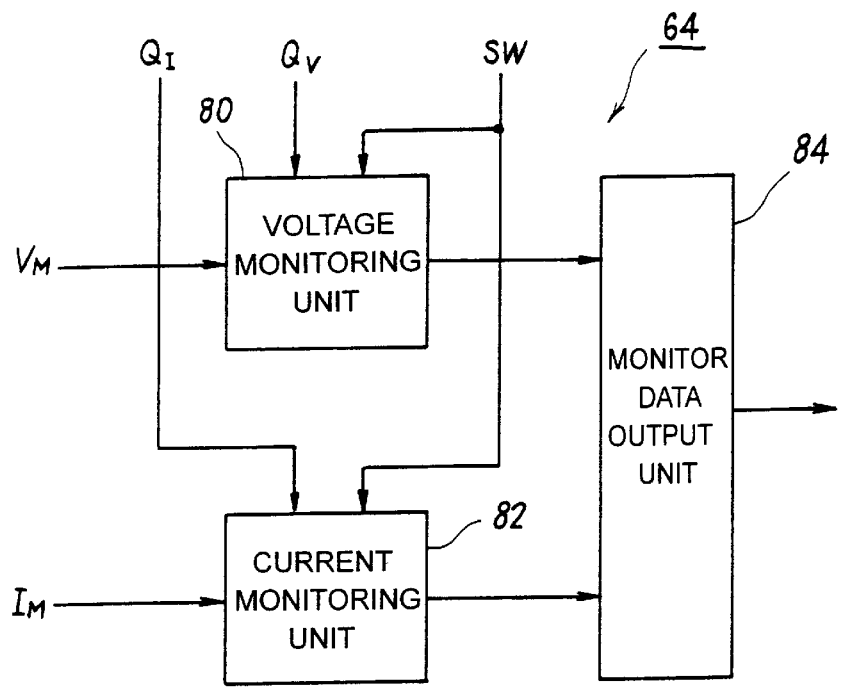
FIG. 4 is a block diagram showing by way of example a configuration of a monitoring unit included in the first embodiment.

FIG. 4 illustrates by way of example a configuration of the monitoring unit 64 for use in the first embodiment. The monitoring unit 64 of this example includes a voltage monitoring unit 80, a current monitoring unit 82 and a monitor data output unit 84.

The voltage monitoring unit 80 accepts a welding current control mode selection signal SW from the sequence control unit 52, and when the constant-current control mode is in selection, i.e., when the selection signal SW has a predetermined logical value, e.g., 0, it executes a voltage monitoring of the interelectrode voltage measured value $V_M$ from the voltage measuring circuit 40.

When the constant-voltage control mode is in selection, i.e., when the selection signal SW from the sequence control unit 52 is 1, the current monitoring unit 82 executes a current monitoring of the welding current measured value $I_M$ from the current measuring circuit 36.

The monitor data output unit 84 stores data on the results of monitoring acquired by both the monitoring units 80 and 82 in its memory and provides the monitor data on display items as its output to the display unit 48 after analyses or integration processing required. The monitor data to be output for display can include ordinary monitor data such as measured values, maximal and minimal values, and good-or-defective judgment, as well as histories of the welding current control modes selected by the first embodiment during the welding current supply, that is, data on the switching points, the duration, etc., of the welding current control modes.

Figure 5:
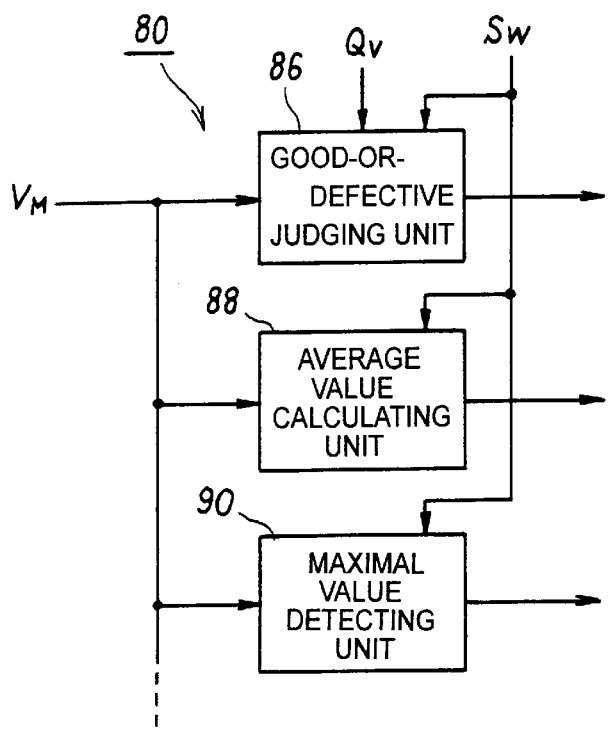
FIG. 5 is a block diagram showing by way of example a configuration of a voltage monitoring unit included in the first embodiment.

FIG. 5 depicts an example of the configuration of the voltage monitoring unit 80. The voltage monitoring unit 80 includes for example a good-or-defective judging unit 86, an average value calculating unit 88 and a maximal value (peak value) detecting unit 90. The good-or-defective judging unit 86 receives a monitor value $Q_V$ for good-or-defective judgment from the setting unit 50. The current monitoring unit 82 may also have a configuration similar to that of the above voltage monitoring unit 80.

Figure 6:
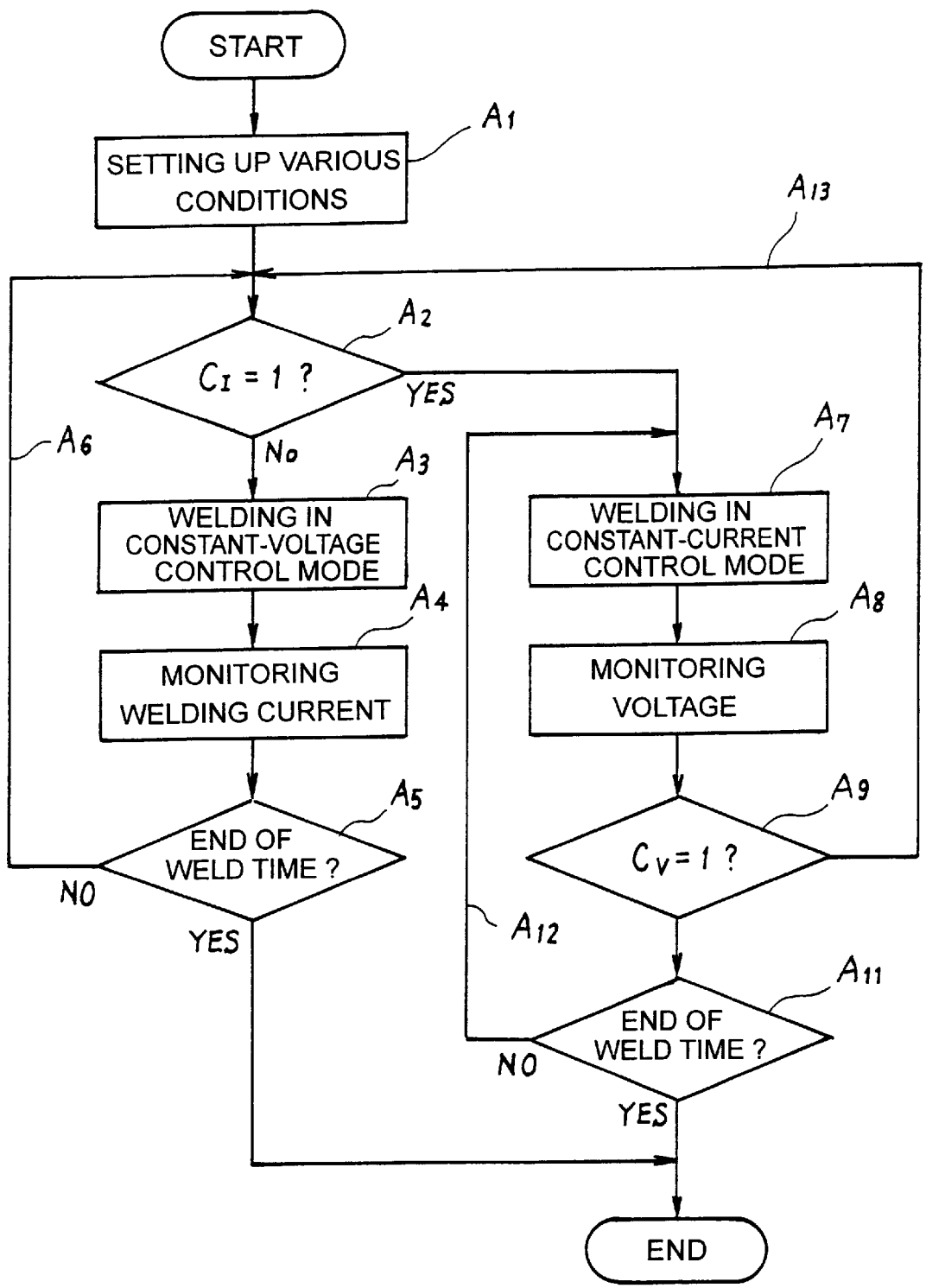
FIG. 6 is a flowchart showing a procedure of processings effected by the main control unit, for welding current supply in the first embodiment.

Referring then to FIGS. 6, 7A and 7B, description will be made of an example of functions provided by the resistance welding power supply apparatus of the first embodiment. FIG. 6 depicts a procedure of processings effected by the main control unit 32, and FIGS. 7A and 7B depict waveforms of the welding current I and the interelectrode voltage V, respectively, during the welding current supply. In this example the mode switching monitor unit 62 has the configuration illustrated in FIG. 3.

Once an activation signal is issued from an external device not shown such as a welding robot in a situation where the welding electrodes 24 and 26 are brought into pressure contact with the materials $W_1$ and $W_2$ by a predetermined weld force from the pressurizing mechanism, the main control unit 32 initiates a supply of welding current in response to the signal. At that time, the activation signal may serve not merely to designate the initiation of the welding current supply but also to specify the condition No. or schedule No. of the present welding current supply.

In the main control unit 32 the setting unit 50 first reads from the memory various set values related to the present welding current supply, such as the current supply time, current set value, voltage set value, reference value for reference and monitor value for monitoring and sets them in the registers, counters, etc., corresponding thereto (step $A_1$).

Next, the main control unit 32 confirms that the output $C_I$ of the comparator 68 for current comparison in the mode switching monitor unit 62 is 0 (step $A_2$). The main control unit 32 then allows the selector unit 58 to select the voltage error detector unit 56, to initiate the current supply in the constant-voltage control mode (step $A_3$).

It is desirable in the ordinary resistance welding that the constant-voltage control mode is selected immediately after the initiation of the current supply with a view to preventing occurrence of any spatters.

A control pulse CP is then issued at a predetermined switching frequency (20 kHz) from the PWM pulse generator unit 60. In response to the control pulse CP, the drive circuit 44 switchingly drives all the transistors $TR_1$, $TR_2$, . . . $TR_n$ of the transistor group 22 simultaneously, namely, at the same timing.

As a result of such switching actions of all the transistors $TR_1$, $TR_2$, . . . $TR_n$, the capacitor 20 causes electrical discharge via the transistor group 22 to the welding electrodes 24 and 26 and thence to the materials $W_1$ and $W_2$ to be welded together, allowing a DC welding current I to flow therethrough.

For each cycle of the switching frequency, a measured value $I_M$ of the welding current I is obtained from the current measuring circuit 36, while simultaneously a measured value $V_M$ of the interelectrode voltage V is obtained from the interelectrode voltage measuring circuit 40.

Since selection is being made of the constant-voltage controlled welding current control mode, using the interelectrode voltage measured value $V_M$ as a feedback signal the constant-voltage control is provided for allowing the value of the interelectrode voltage V to coincide with the voltage set value $V_S$, by the voltage error detector unit 56, selector unit 58 and PWM pulse generator unit 60.

In the monitoring unit 64, on the other hand, the current monitoring unit 82 becomes enabled to monitor the welding current I (step $A_4$). Immediately after the initiation of the current supply the welding current I will rise up and hence monitoring may be made of e.g., current waveforms representative of the rise characteristics.

Thus, immediately after the initiation of the current supply the welding current will rise up with the interelectrode voltage V kept in the vicinity of the set value $V_S$ under the action of the constant-voltage control. Then, when the welding current I reaches the reference value $I_I$ for comparison at the time $t_a$ the mode switching monitor unit 62 turns the output of the comparator 68 to 1 (step $A_2$), in response to which the sequence control unit 52 switches the selector unit 58.

This switching makes transition of the welding current control mode from the constant-voltage control to the constant-current control, after which using the welding current measured value $I_M$ as a feedback signal the constant-current control is provided for causing the value of the welding current I to coincide with the current set value $I_S$, by the current error detector unit 54, selector unit 58 and PWM pulse generator unit 60 (step $A_7$).

In the monitoring unit 64, on the other hand, the selection signal SW results in 0, allowing the voltage monitoring unit 80 to turn enabled to monitor the interelectrode voltage V (step $A_8$). It is typically seen that when the welding current is kept at the set value as in FIG. 7A by virtue of the constant-current control, the interelectrode voltage V as indicated by a solid line L of FIG. 7B will once lower to reach the minimal value $V_{min}$, after which it starts to rise to reach the maximal value $V_{max}$ and thence it will continue to lower till the termination of the current supply. Such a dynamic characteristic (waveform) of the interelectrode voltage V is monitored by the maximal value detecting unit 90 and so forth.

Under the constant-current control there may be a certain correlation between the waveform pattern of the interelectrode voltage V and the weld quality. For example, in the event of occurrence of any spatters the interelectrode voltage V will rise up to an extraordinary level as indicated by a chain dotted line L' of FIG. 7B.

By choosing the voltage reference value $V_J$ for comparison fed to the mode switching monitor unit 62 to be substantially high, it is possible to continue the constant-current control till the termination of the weld period irrespective of the welding quality after the rise of the welding current I and to obtain monitor data on the characteristics of the interelectrode voltage V. Thus, if good welding results are obtained of a certain set current value $I_S$, then the characteristics of the interelectrode voltage V corresponding thereto will become known, making it possible to obtain data for reference usable when selecting set values in the case of execution of the welding current supply under the constant-voltage control. On the contrary, even though defective welding is judged, the characteristics of the interelectrode voltage V at that time can be data serviceable for the analysis of the welding phenomena. In any event, the results are beneficial monitor data on the essential electrical parameters invisible to the feedback control unit.

Furthermore, by choosing the voltage reference value $V_J$ for comparison to be an appropriate value $V_J$, higher to some extent than the voltage set value $V_S$, it is also possible to detect any extraordinary rise of the interelectrode voltage V under the constant-current control at an earlier stage (at the time $t_b$ in the example of FIG. 7B) (step $A_9$) and to make immediate switching to the constant-voltage control (step $A_{13}$).

It will be appreciated that the procedure of processings of FIG. 6 is shown merely by way of example and that various modifications are feasible in accordance with the configuration of the mode switching monitor unit 62 and with the setting of the reference values imparted to this monitor unit 62.

It will also be appreciated that the transistor resistance welding power supply apparatus having the configuration shown in FIG. 1 is a mere exemplary one and that the present invention is applicable to various other resistance welding power supply apparatuses as well.

Figure 8:
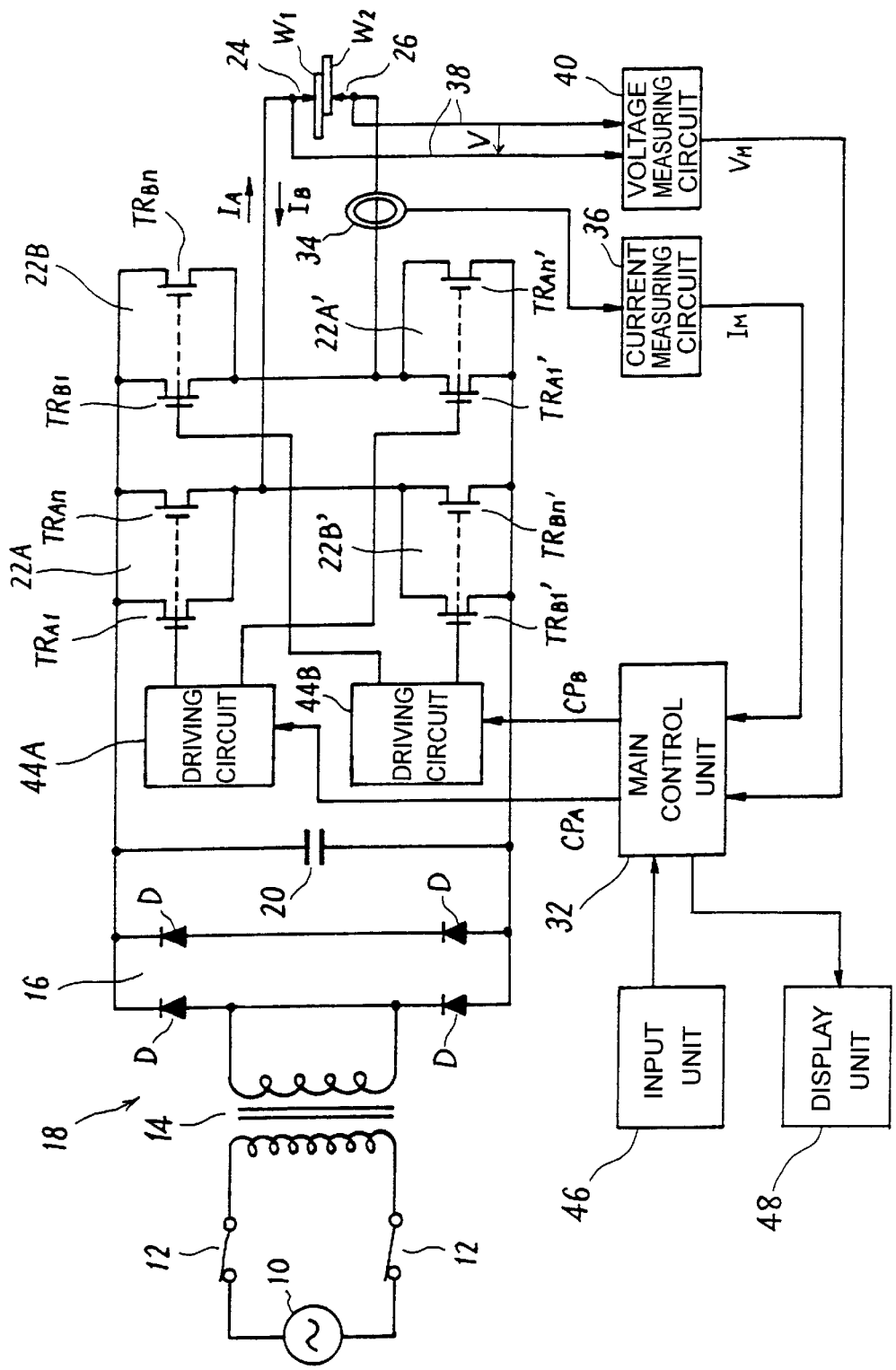
FIG. 8 is a block diagram showing a circuit configuration of a transistor resistance welding power supply apparatus in accordance with a second embodiment of the present invention.

FIG. 8 illustrates a configuration of a transistor resistance welding power supply apparatus in accordance with a second embodiment of the present invention. In the diagram, like reference numerals are given to parts having similar configurations and functions to those of the power supply apparatus of the first embodiment.

This resistance welding power supply apparatus comprises four sets of transistor groups 22A, 22A', 22B and 22B'.

The first transistor group 22A' consists of a predetermined number of, e.g., 25 high-speed transistors $TR_{A1}$, to $TR_{An}$, such as FETs or IGBTs which are connected in parallel with one another. Each transistor $TR_{Ai}$, has a first terminal electrically connected to the welding electrode 26 on one hand and has a second terminal electrically connected to one terminal of the capacitor 20. Each transistor $TR_{Ai}$, further has a control terminal connected to an output terminal of a driving circuit 44A.

The second transistor group 22A consists of a predetermined number of, e.g., 25 high-speed transistors $TR_{A1}$, to $TR_{An}$ such as FETs or IGBTs which are connected in parallel with one another. Each transistor $TR_{Ai}$ has a first terminal electrically connected to the other terminal of the capacitor 20 and has a second terminal electrically connected to the welding electrode 24 on the other. Each transistor $TR_{Ai}$ further has a control terminal connected to the output terminal of the driving circuit 44A.

The third transistor group 22B' consists of a predetermined number of, e.g., 25 high-speed transistors $TR_{B1}$, to $TR_{Bn}$, such as FETs or IGBTs which are connected in parallel with one another. Each transistor $TR_{Bi}$, has a first terminal electrically connected to the welding electrode 24 on the other and has a second terminal electrically connected to the one terminal of the capacitor 20. Each transistor $TR_{Bi}$, further has a control terminal connected to an output terminal of a driving circuit 44B.

The fourth transistor group 22B consists of a predetermined number of, e.g., 25 high-speed transistors $TR_{B1}$ to $TR_{Bn}$ such as FETs or IGBTs which are connected in parallel with one another. Each transistor $TR_{Bi}$ has a first terminal electrically connected to the other terminal of the capacitor 20 and has a second terminal electrically connected to the welding electrode 26 on one hand. Each transistor $TR_{Bi}$ further has a control terminal connected to the output terminal of the driving circuit 44B.

In this resistance welding power supply apparatus, the main control unit 32 provides such a control as to allow selective switching operations of the first and second transistor groups (22A' and 22A) and of the third and fourth transistor groups (22B' and 22B) by way of the separate driving circuits 44A and 44B, respectively.

Figure 9A:
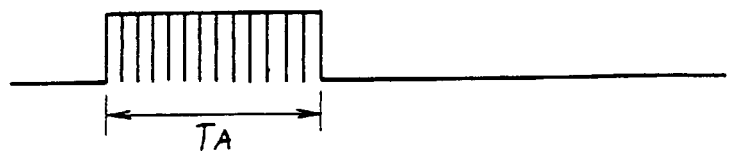
FIGS. 9A to 9C illustrate functions of switching method employed by the resistance welding power supply apparatus of FIG. 8.
Figure 9B:
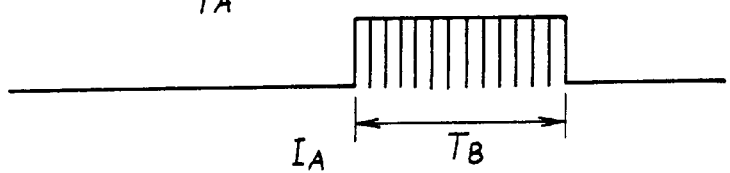
Figure 9C:
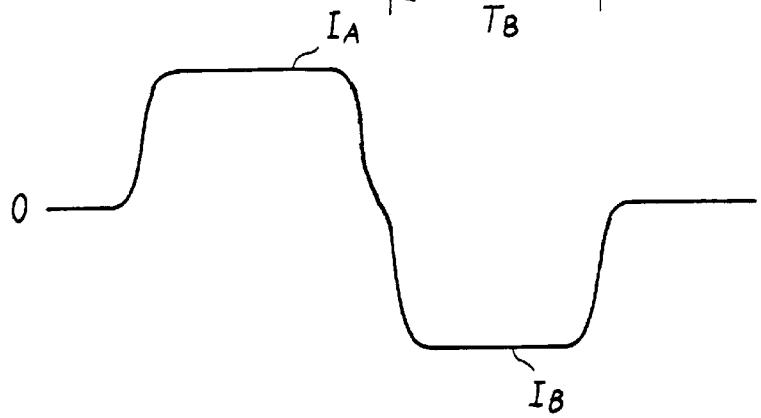

As seen in FIGS. 9A to 9C, when the first and second transistor groups (22A' and 22A) are subjected to a selective switching operation, a welding current $I_A$ flows in the positive direction through the welding electrodes 24, 26 and the materials $W_1$, $W_2$ to be welded together. This mode corresponds to that of the power supply apparatus in the first embodiment described above. On the contrary, when the third and fourth transistor groups (22B' and 22B) undergo a selective switching operation, a welding current $I_B$ flows in the reverse (negative) direction therethrough.

Figure 10:
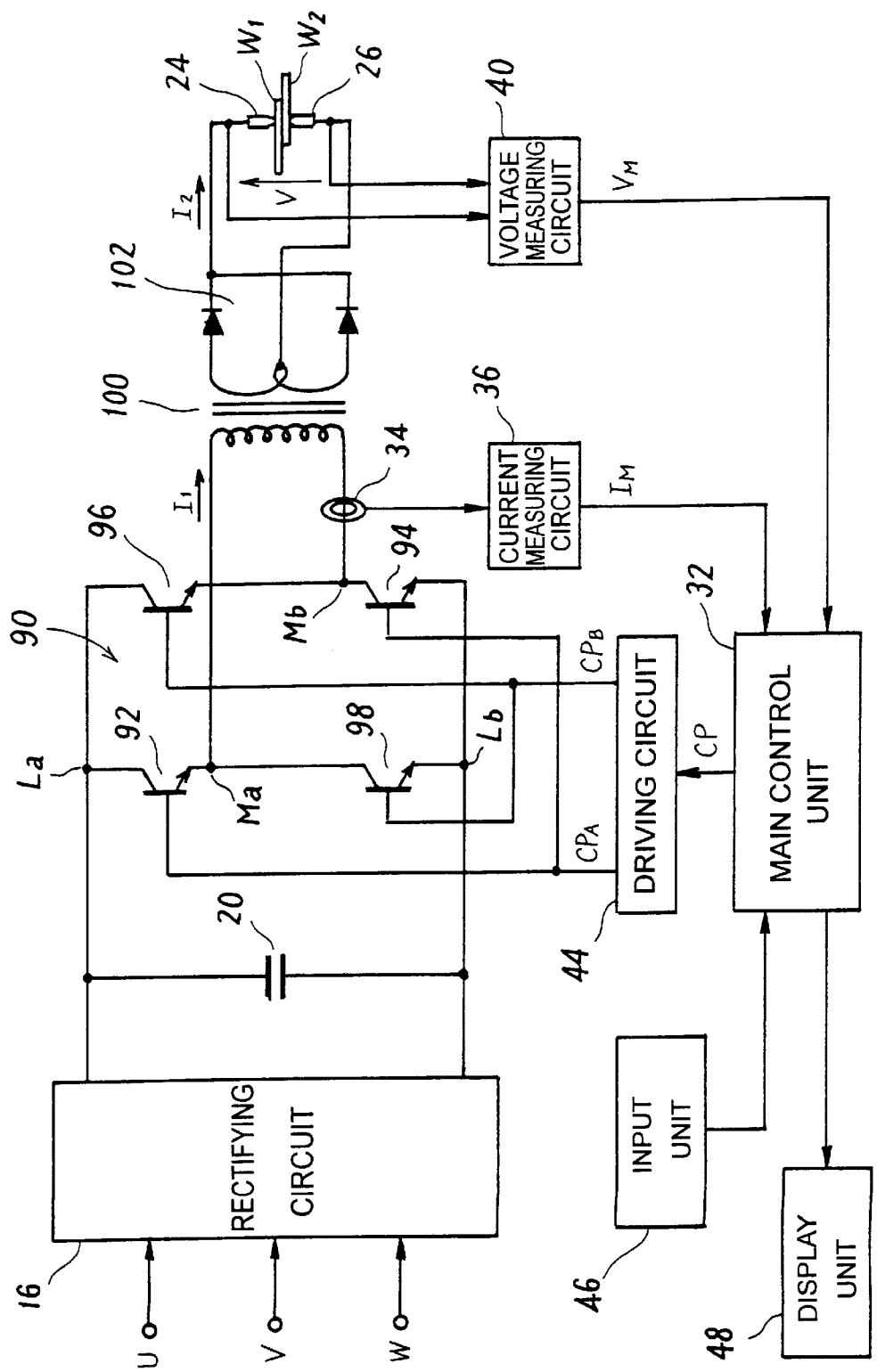
FIG. 10 is a block diagram showing a circuit configuration of a DC inverter resistance welding power supply apparatus in accordance with a third embodiment of the present invention.

FIG. 10 illustrates a configuration of a DC inverter resistance welding power supply apparatus in accordance with a third embodiment of the present invention. An inverter 90 of this resistance welding power supply apparatus consists of four transistor switching elements 92, 94, 96 and 98 such as GTRs (giant transistors) or IGBTs.

Of the four switching elements 92 to 98, a first set of (positive side) switching elements 92 and 94 are on/off controlled at one time by a first control pulse $CP_A$ from the driving circuit 44, whereas a second set of (negative side) switching elements 96 and 98 are on/off controlled at one time by a second control pulse $CP_B$ from the driving circuit 44.

The inverter 90 has input terminals $L_a$ and $L_b$ connected to output terminals of the rectifier circuit 16 and has output terminals $M_a$ and $M_b$ connected to a primary coil of a welding transformer 100. A secondary coil of the welding transformer 100 is electrically connected to the welding electrodes 24 and 26 by way of a rectifier circuit 102 composed of a pair of diodes.

In this inverter resistance welding power supply apparatus, the positive switching elements 92, 94 and the negative switching elements 96, 98 are alternately turned on/off at a predetermined high frequency (e.g., 10 kHz) in response to the first and second control pulses $CP_A$ and $CP_B$ from the main control unit 32, so that there appears a high-frequency, rectangular AC pulse voltage at the output terminals $M_a$ and $M_b$.

The high-frequency, rectangular AC pulse voltage output from the inverter 90 is applied to the primary coil of the welding transformer 100 so as to acquire a low-voltage, large-current AC pulses at the secondary coil of the welding transformer 100. The AC pulses on the secondary side are converted into DC by the rectifier circuit 102, with this DC secondary current (welding current) $I_2$ flowing through the welding electrodes 24, 26 and the materials $W_1$, $W_2$ to be welded together.

Figure 11:
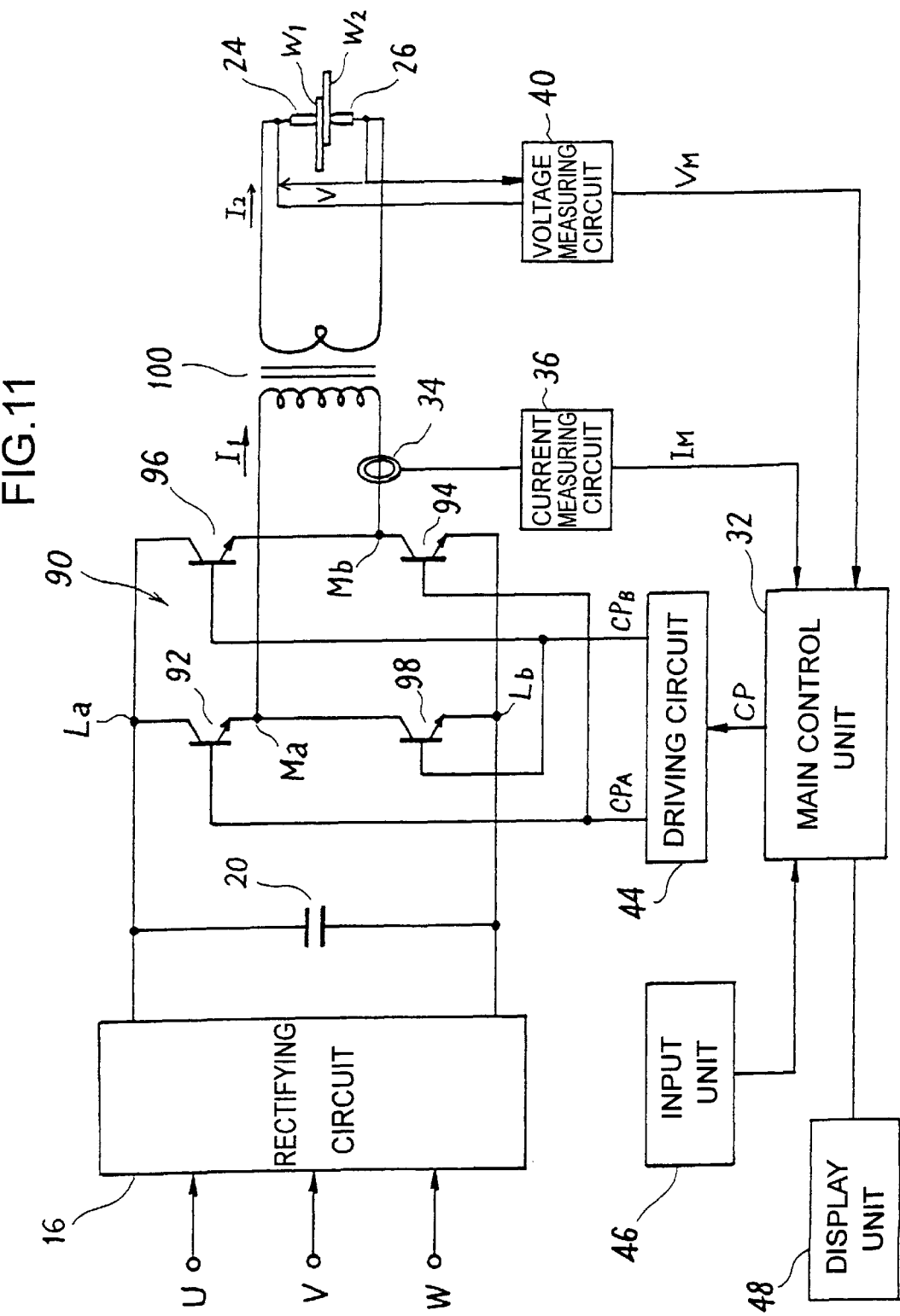
FIG. 11 is a block diagram showing a circuit configuration of an AC inverter resistance welding power supply apparatus in accordance with a fourth embodiment of the present invention.

FIG. 11 illustrates a configuration of an AC inverter resistance welding power supply apparatus in accordance with a fourth embodiment of the present invention. This power supply apparatus comprises the welding transformer 100 whose secondary coil is connected directly to the welding electrodes 24 and 26, with the exclusion of the rectifier circuit 102 on the secondary side from the power supply apparatus of FIG. 10.

The main control unit 32 provides an alternate high-frequency switching control of the positive switching elements 92, 94 and negative switching elements 96, 98 of the inverter 90 every weld period $T_A$ corresponding to a half $T_W/2$ of one cycle $T_W$ set for the AC welding current on the secondary side.

Figure 12A:
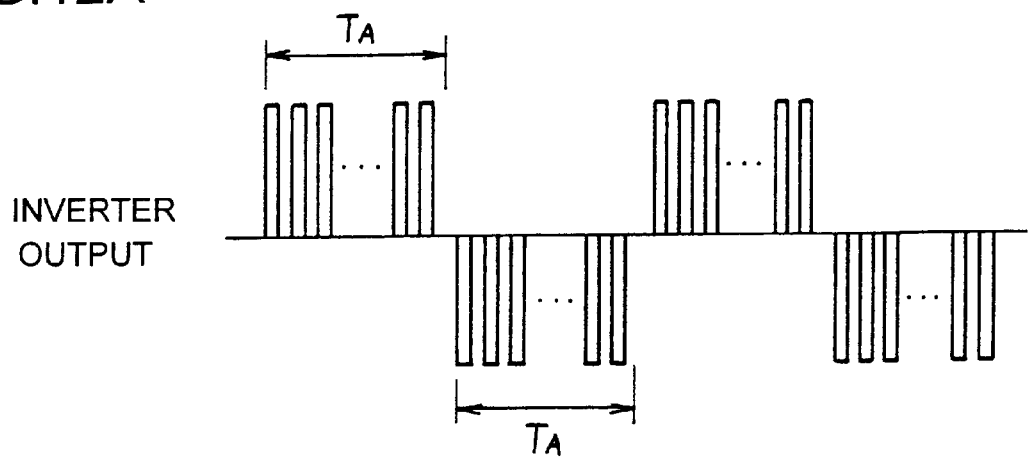
FIGS. 12A and 12B illustrate functions of switching method employed by the resistance welding power supply apparatus of FIG. 11.
Figure 12B:
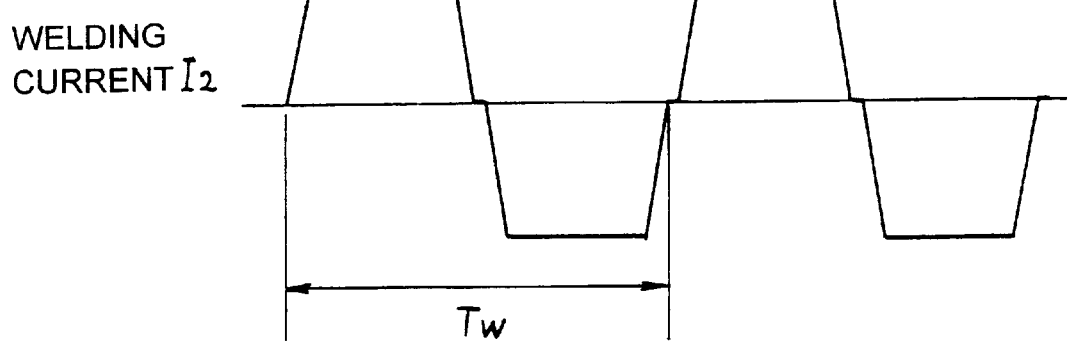

More specifically, as seen in FIGS. 12A and 12B, in a first weld period $T_A$ corresponding to a positive half cycle of the AC welding current the positive switching elements 92 and 94 are switching controlled at a high frequency, e.g., 10 kHz while keeping the negative switching elements 96 and 98 in OFF state. In a second weld period $T_A$ corresponding to a negative half cycle of the AC welding current the negative switching elements 96 and 98 are switching controlled at the same high frequency (10 kHz) with the positive switching elements remaining OFF.

This allows high-frequency pulses whose polarities reverse every weld period $T_A$ to be fed from the output terminal of the inverter 90 to the primary coil of the welding transformer 100, with the result that in a circuit associated with the secondary coil of the welding transformer 100, a welding current $I_2$ having a cycle $T_W$ will flow via the pair of welding electrodes 24 and 26 into the materials $W_1$ and $W_2$ to be welded together, thereby effecting the resistance welding of weld parts of the materials $W_1$ and $W_2$.

In the transistor or inverter resistance welding power supply apparatus of the present invention, as set forth hereinabove, the constant-current control and the constant-voltage control can both be set, so that by selectively switching the two welding current control methods in an appropriate manner in accordance with welding requirements or welding circumstances, flexible adaptations will be feasible to a diversity of welding requirements or to variances in the welding circumstances.

Moreover, in the resistance welding power supply apparatus of the present invention, automatic voltage monitoring is provided for the duration in which the current supply is performed in constant-current control method, whereas automatic current monitoring is provided for the duration when the current supply is performed in constant-voltage control method, so that beneficial monitoring data can be obtained on essential electrical parameters invisible to the feedback control unit and further on the status of the weld parts under welding current supply.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A transistor or inverter resistance welding power supply apparatus comprising:

set value input means for the input of a desired current set value and a desired voltage set value;

constant-current control means for allowing a current fed to materials to be welded together to coincide with said current set value;

constant-voltage control means for allowing a voltage between a pair of welding electrodes to coincide with said voltage set value;

welding current control mode selecting means for selecting either of a first welding current control mode provided by said constant-current control means and a second welding current control mode provided by said constant-voltage control means, said selecting means making a switchover from said first welding current control mode to said second welding current control mode when said interelectrode voltage reaches a predetermined critical voltage value, said selecting means making a switchover from said second welding current control mode to said first welding current control mode when said current fed to said materials to be welded together reaches a predetermined critical current value; and welding current sequence control means for executing a welding current supply in a welding current control mode selected by said welding current control mode selecting means.

2. A resistance welding power supply apparatus according to claim 1, wherein said welding current control mode selecting means include priority mode selecting means for selecting either of said first welding current control mode and said second welding current control mode in accordance with a previously set priority when said current fed to said materials to be welded together has not yet reached said critical current value and when said interelectrode voltage has not yet reached said critical voltage value.

3. A resistance welding power supply apparatus according to claim 1, further comprising:

current monitoring means for monitoring a current fed to said materials to be welded together;

voltage monitoring means for monitoring a voltage between said pair of welding electrodes; and monitor mode selecting means for selecting a first monitor mode provided by said voltage monitoring means when said first welding current control mode is in selection, and for selecting a second monitor mode provided by said current monitoring means when said second welding current control mode is in selection.

4. A resistance welding power supply apparatus according to claim 2, further comprising:

current monitoring means for monitoring a current fed to said materials to be welded together;

voltage monitoring means for monitoring a voltage between said pair of welding electrodes; and monitor mode selecting means for selecting a first monitor mode provided by said voltage monitoring means when said first welding current control mode is in selection, and for selecting a second monitor mode provided by said current monitoring means when said second welding current control mode is in selection.

5. A resistance welding power supply apparatus according to claim 1, further comprising welding current control mode history recording means for recording a history of welding current control modes selected during the welding current supply.

6. A resistance welding power supply apparatus according to claim 2, further comprising welding current control mode history recording means for recording a history of welding current control modes selected during the welding current supply.

7. A resistance welding power supply apparatus according to claim 3, further comprising welding current control mode history recording means for recording a history of welding current control modes selected during the welding current supply.

8. A resistance welding power supply apparatus according to claim 4, further comprising welding current control mode history recording means for recording a history of welding current control modes selected during the welding current supply.

* * * * *